(12) United States Patent
Dicke

(10) Patent No.: US 6,402,448 B1
(45) Date of Patent: Jun. 11, 2002

(54) SELF-DRILLING AND SELF-TAPPING SCREW

(75) Inventor: Robert Dicke, Ennepetal (DE)

(73) Assignee: A-Z Ausrüstung und Zubehör GmbH & Co., Hattingen (DE)

( * ) Notice: Subject to any disclaimer, the term of this patent is extended or adjusted under 35 U.S.C. 154(b) by 0 days.

(21) Appl. No.: 09/419,142

(22) Filed: Oct. 15, 1999

Related U.S. Application Data

(63) Continuation of application No. PCT/EP98/02164, filed on Apr. 14, 1998.

(30) Foreign Application Priority Data

Apr. 15, 1997 (DE) ...................................... 297 06 749 U

(51) Int. Cl.[7] .............................................. F16B 25/10
(52) U.S. Cl. ................... 411/387.5; 411/387.1; 408/224
(58) Field of Search ............................. 408/225, 224, 408/223; 411/387.1–387.8

(56) References Cited

U.S. PATENT DOCUMENTS

| | | | |
|---|---|---|---|
| 3,578,762 A | | 5/1971 | Siebol et al. |
| 3,592,555 A | * | 7/1971 | Mackey ........................ 408/225 |
| 4,028,987 A | * | 6/1977 | Wilson ......................... 408/224 |
| 4,480,951 A | * | 11/1984 | Regensburger .............. 408/224 |
| 4,605,347 A | * | 8/1986 | Jodock ......................... 408/224 |
| 5,120,172 A | | 6/1992 | Wakai |

FOREIGN PATENT DOCUMENTS

| | | | | |
|---|---|---|---|---|
| CS | 80109 | * | 1/1951 | ................. 408/224 |
| DE | 4026603 | * | 4/1991 | ................. 408/223 |
| DE | 9314006.1 | | 1/1994 | |
| GB | 519475 | * | 3/1940 | ................. 408/223 |
| WO | WO9524566 | | 9/1995 | |

* cited by examiner

Primary Examiner—Flemming Saether
(74) Attorney, Agent, or Firm—Harness, Dickey & Pierce, P.L.C.

(57) ABSTRACT

The present invention relates to a self-drilling and thread-forming connecting element, a screw, having a threaded shank and a drilling point at the end for the chip-forming drilling of a core hole for the threaded shank. The drilling point is designed as a step drill having at least two drilling steps with different diameters.

3 Claims, 1 Drawing Sheet

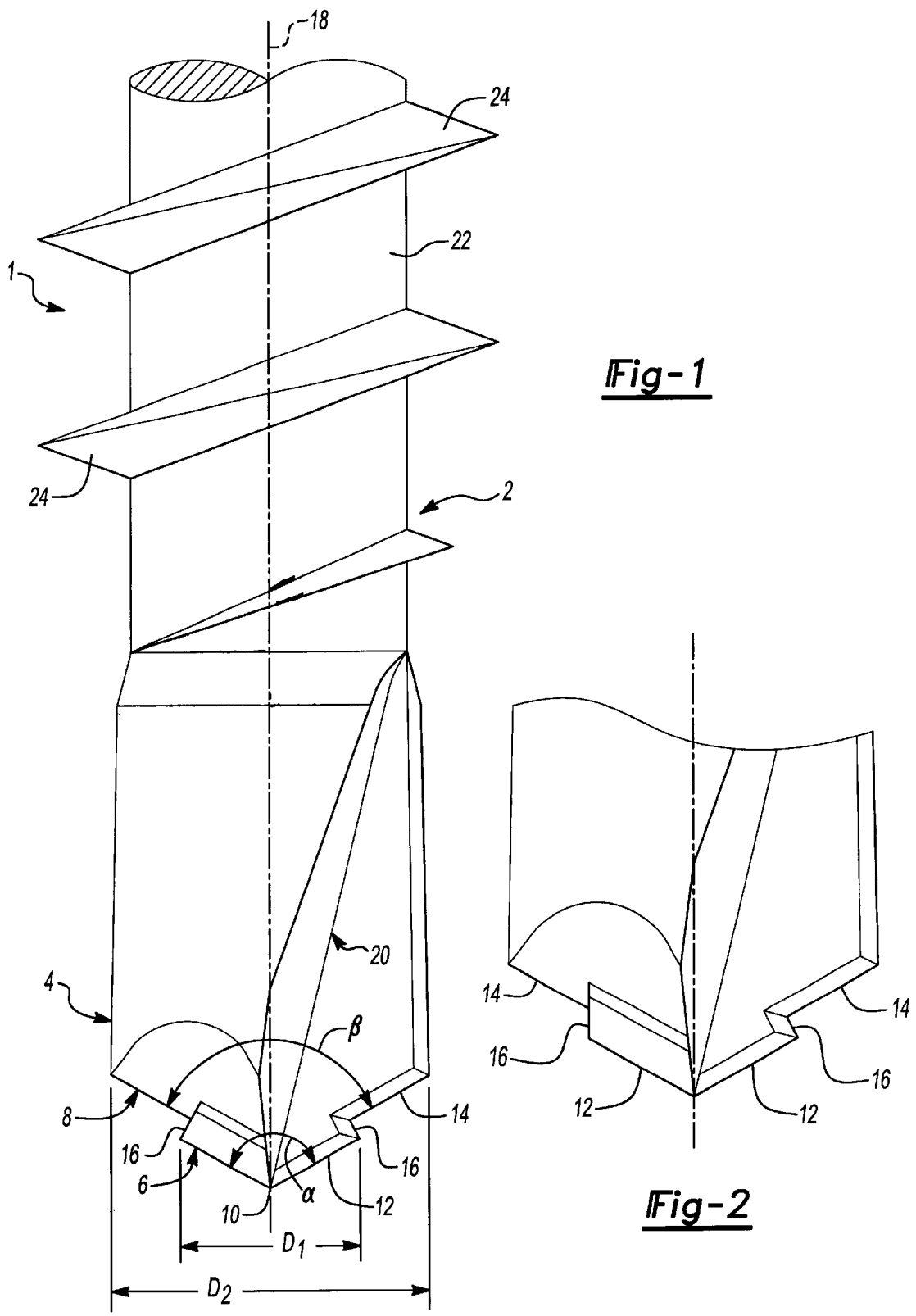

SELF-DRILLING AND SELF-TAPPING SCREW

This is a continuation of International Application No. PCT/EP98/02164, filed Apr. 14, 1998.

BACKGROUND AND SUMMARY OF THE INVENTION

The present invention relates to a self-drilling and thread-forming connecting element, in particular to a screw having a threaded shank and a drilling point at the end for the chip-forming drilling of a core hole for the threaded shank.

Such screws are known, which drill a core hole themselves in the respective material with a chip-forming action by means of their drilling point, and the screw is subsequently screwed into this core hole with the threaded shank like a sheet-metal screw. In the process, a corresponding internal thread forms automatically. To this end, the diameter of the core hole is designed to be correspondingly smaller in adaptation to the design of the thread on the threaded shank, so that a thread can be formed automatically in the core hole.

The object of the invention is to provide such a connecting element in which the drilling behavior, in particular the initial spot drilling during the drilling of the core hole, is improved.

According to the invention, this is achieved with the drilling point designed as a step drill having at least two drilling steps with different diameters. By this design, according to the invention, the first drilling step, which has a drilling point at the end, can be designed with regard to its cutting geometry specifically for good spot-drilling behavior, whereas the second axially adjoining drilling step serves to continuously drill out the core hole and can have a cutting geometry specifically designed for this purpose. Thus different cutting angles may be provided, preferably the cutting angle of the first drilling step, in order to ensure good spot-drilling behavior, may be designed to be smaller (more acute) than the cutting angle of the second drilling step.

As a result, the connecting element according to the invention is also especially well suited for direct drilling and screwing into sheet-metal materials by virtue of the fact that the sheet rolling skin, which as a rule is relatively hard or tough, can be destroyed by the first step.

The invention is to be explained in more detail with reference to a preferred exemplary embodiment shown in the drawing. In the drawing, the single figure shows the point-side end section of a connecting element according to the invention.

BRIEF DESCRIPTION OF THE DRAWINGS

The various advantages of the present invention will become apparent to those skilled in the art after reading the following specification and by reference to the drawing, in which:

FIG. 1 is a partial elevational view of the connecting element of the preferred embodiment of the present invention.

FIG. 2 is an enlarged detail view showing the drilling point of the connecting element of an alternative embodiment of the present invention.

DETAILED DESCRIPTION OF THE PREFERRED EMBODIMENT

Partly illustrated by way of example in FIG. 1 as a connecting element, is a screw 1, which has a threaded shank 2 and a drilling point 4 at the end. In addition, the screw 1, on the other side, may have a screw head (not shown) having any desired slot or application point for a rotary tool. However, the connecting element may also be designed, for example, without a head as a threaded stud or the like.

According to the invention, the drilling point 4 Is designed as a step drill having at least two drilling steps 6 and 8 which are arranged axially one behind the other and having different diameters D1 and D2. The first drilling step 6 at the end has a spot-drilling point 10.

Each drilling step 6, 8 comprises (at least) two cutting edges 12 and 14, respectively, which define a certain cutting angle $\alpha$ and $\beta$, respectively. The cutting edges 12 of the first drilling step 6 enclose a cutting angle $\alpha$, whereas the cutting edges 14 of the second drilling step 8 define a cutting angle $\beta$. In the exemplary embodiment shown, the cutting angles $\alpha$ and $\beta$ are dimensioned to be approximately the same size, but they may also be different. If the cutting angles $\alpha$ and $\beta$ are different, the cutting angle $\alpha$ of the first drilling step 6 is preferably smaller than the cutting angle $\beta$ of the second drilling step 8.

The cutting edges 12 of the first drilling step 6 merge into the cutting edges 14 of the second drilling step 8 via transition edges 16. In this case, the transition edges 16, starting from the cutting edges 12 of the first drilling step 6, preferably run obliquely inwards with a certain undercut up to the cutting edges 14 of the second drilling step 8. If need be, however, the transition edges 16 can run parallel to one another and to the longitudinal axis 18 as shown in FIG 2. Thus, the region of the transition edges 16 has no separate chip-forming drilling action.

In the exemplary embodiment shown, the transition edges 16 run approximately at right angles to the cutting edges 12, 14 of the drilling steps 6, 8. Furthermore, it can be seen from the drawing that a common, approximately axially running flute 20 is in each case located in front of the cutting edges 12, 14 in the direction of rotation.

The screw 1, at least in the region of the drilling point 4, but preferably also in the region of the threaded shank, is made of a hardened, highly carburized steel.

Finally, it may also be mentioned that the threaded shank 2 consists of an essentially cylindrical shank 22, i.e. a shank which is circular in diameter, and which has a single or multi-start thread 24 formed as a helically running prominence.

It is to be understood that the invention is not limited to the exact construction illustrated and described above, but that various changes and modifications may be made without departing from the spirit and scope of the inventions as defined in the following claims.

What is claimed is:

1. A self-drilling and thread-forming fastener comprising:
   a screw extending along a longitudinal axis and having a threaded shank portion and a drilling point located at generally opposite longitudinal ends thereof;
   said drilling point comprising a first drilling step of a first diameter and a second drilling step of a second diameter, each said drilling step having a first cutting edge and a second cutting edge, said first and second cutting edges being symmetrical about said longitudinal axis;
   said first and second cutting edges of said first drilling step defining a first cutting angle of less than 180 degrees and said first and second cutting edges of said second drilling step defining a second cutting angle of less than 180 degrees;

wherein said first and second cutting edges of said first drilling step merge into said first and second cutting edges of said second drilling step at first and second transition edges, each said transition edge extending perpendicularly from one of said first and second cutting edges of said first drilling step to one of said first and second cutting edges of said second drilling step, said first and second transition edges each extending obliquely relative to said longitudinal axis.

2. The self-drilling and thread forming fastener according to claim 1, wherein said first cutting angle and said second cutting angle are equal.

3. The self-drilling and thread forming fastener according to claim 1, further comprising:
 a flute located in front of said cutting edges as determined by the direction of forward rotation of said fastener.

* * * * *